July 19, 1960 J. S. KALLER 2,945,698
DISTRIBUTOR MACHINE FOR THE DISTRIBUTION OF FERTILIZER
Filed Dec. 11, 1956 3 Sheets-Sheet 1

Inventor
J. S. Kaller

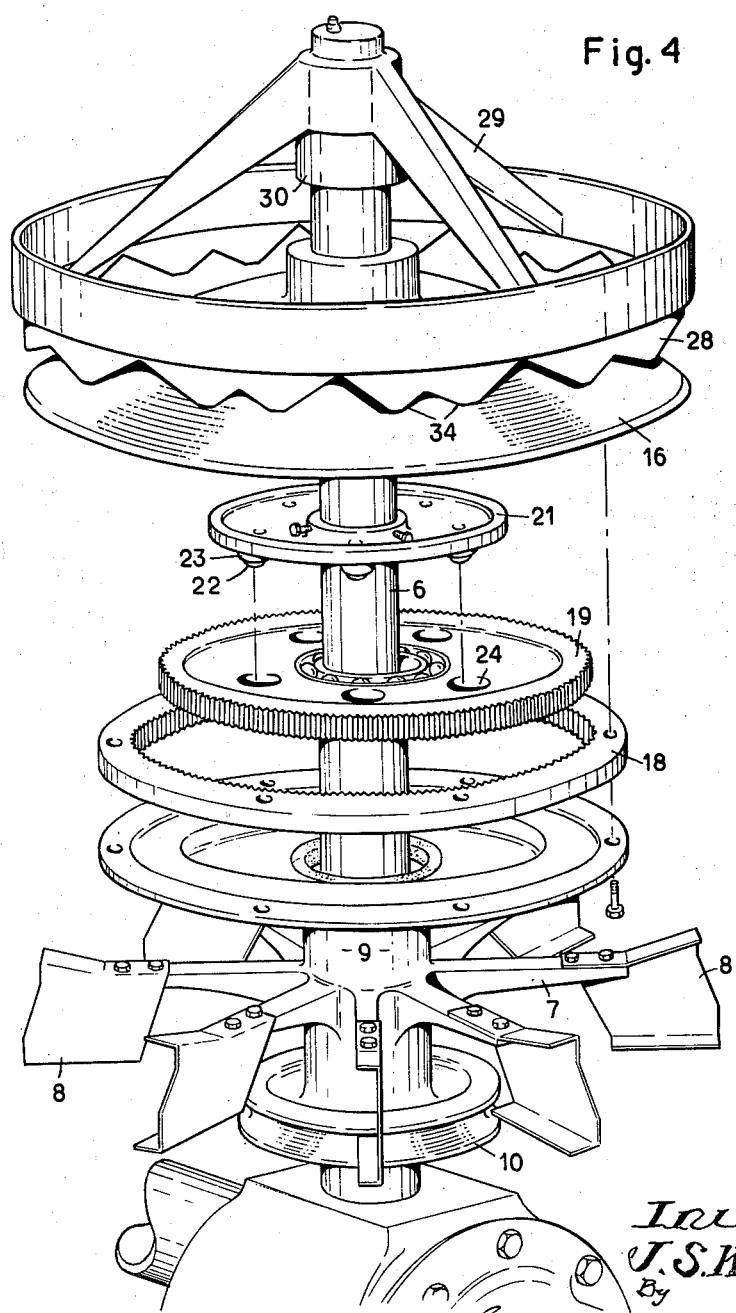

2,945,698
DISTRIBUTOR MACHINE FOR THE DISTRIBUTION OF FERTILIZER

Johan Sigurd Kaller, Vadursgatan 2A, Linkoping, Sweden

Filed Dec. 11, 1956, Ser. No. 627,616

Claims priority, application Sweden Dec. 13, 1955

3 Claims. (Cl. 275—2)

This invention relates to a distributor machine for the distribution of commercial fertilizer and other granulated materials of the kind which comprises a container or hopper for the fertilizer and underneath said container a spreading mechanism.

An object of the invention is to provide a machine of said kind which is capable of a fair distribution of the fertilizer over the whole range of the machine.

Another object of the invention is to effectively adjust the quantity of the distributed fertilizer.

These and other objects and advantages will appear from the following description and the accompanying drawings, in which Fig. 1 is a perspective view of a distributor machine built in accordance with the invention;

Fig. 4 is an exploded view of a feeding device belonging to the machine, and

Figure 1:
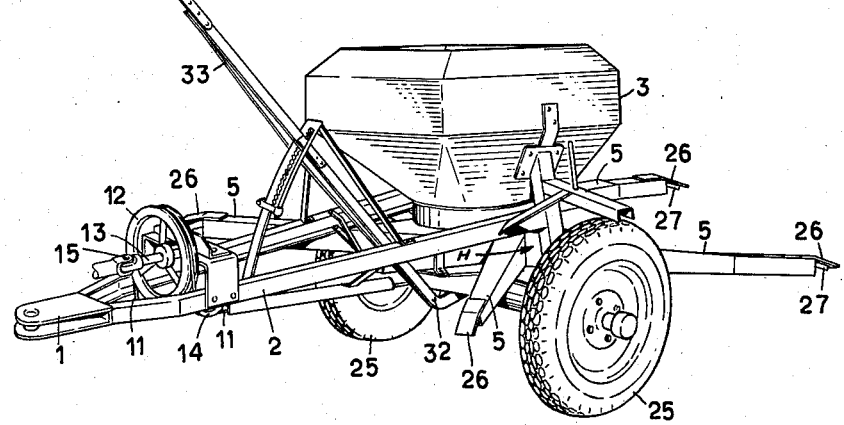
Figure 2:
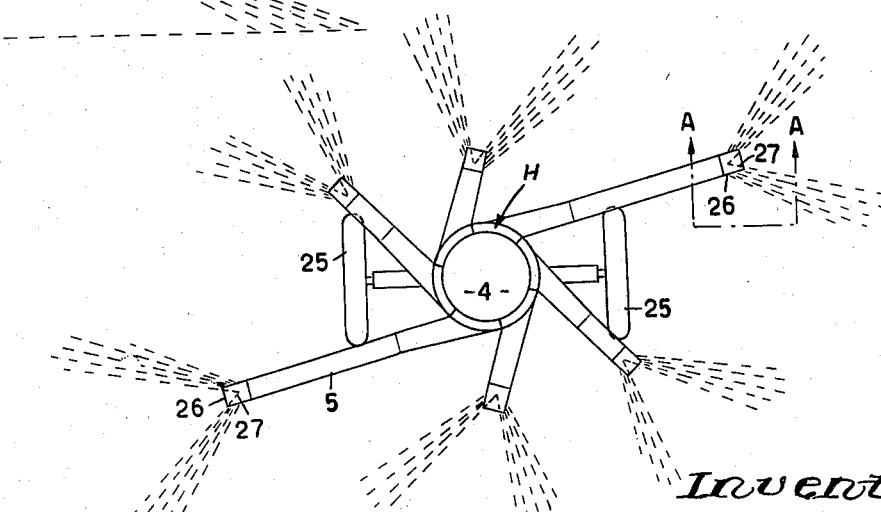
Fig. 2 is a schematic plan view of the machine with the container or hopper and spreading mechanism being removed.
Figure 5:
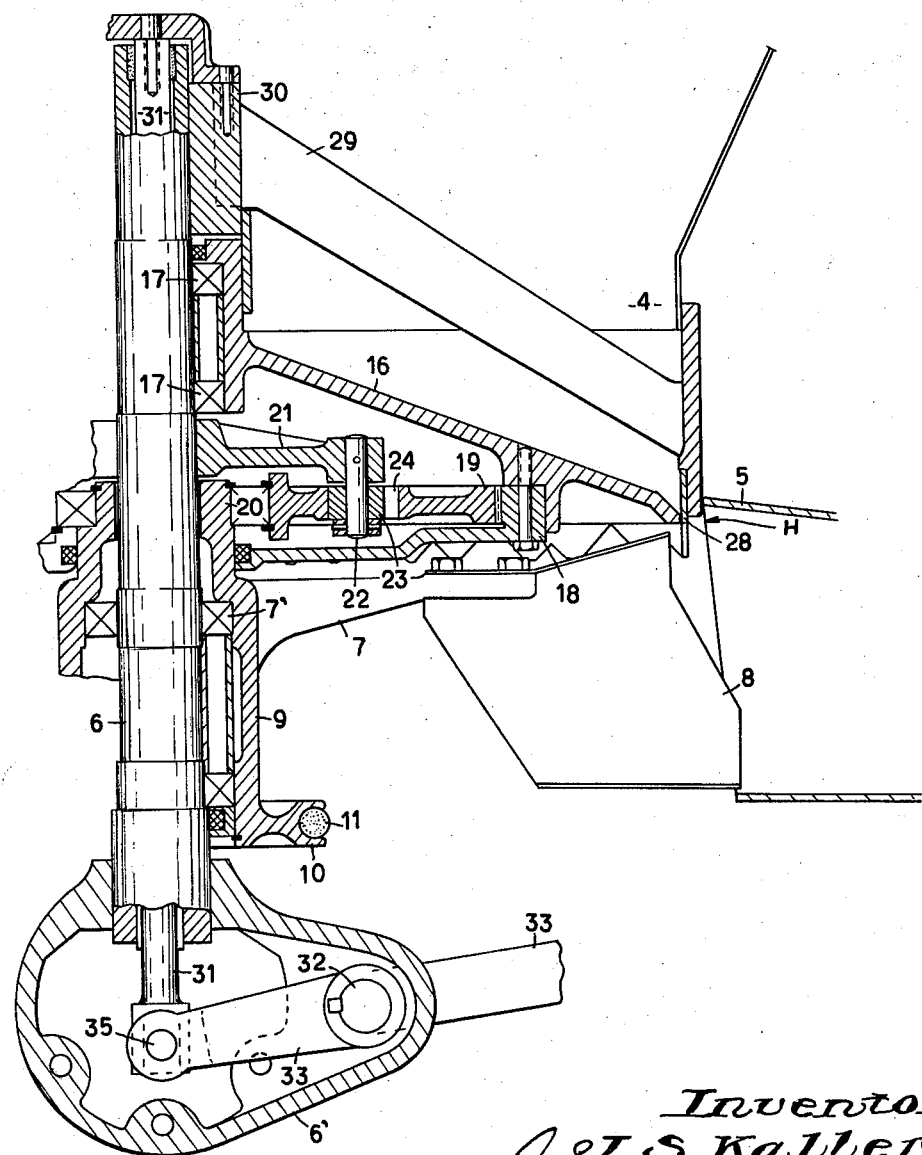
Fig. 5 is a partial sectional view of the feeding device and a part of the container with part broken away.

The shown machine is made as a two wheeled cart, which will be evident from Figs. 1 and 2. The machine can be hitched to a tractor by means of a hitch clevis 1 at the front of the machine. A container or hopper 3 for the fertilizer to be spread is attached to the frame 2 of the machine, which container or hopper is provided at its lower end with an opening 4, as shown in Fig. 5 for a feeding device for the feeding of fertilizer to a number of spreader spouts 5. The spouts 5 are arranged mainly tangentially outwards from and are equally spaced around a circular housing H defined by the inner entrances of the spouts 5.

A vertical axle 6 as shown in Figs. 4 and 5, is firmly connected to a housing 6' on the machine frame and centrally located in the opening 4. For the feeding of the fertilizer from the container 3 the machine is provided with a feeding device, which comprises a fan wheel 7 carried in bearings 7' round said axle 6. Said wheel carries at its periphery a number of fixed band blades 8, which are located in the center of the entrances of the spouts 5. A pulley 10 is made integral with the hub 9 of the fan wheel at its lower portion, which pulley by means of a belt 11 is in driving connection with another pulley 12. The pulley 12 is fixed to a shaft 13, which is carried in a bearing at the front of the frame 2 near the hitch clevis 1. Since the shaft is horizontal, the belt 11 is laid over two idler pulleys 14, which are carried in bearings under the pulley 12. The shaft 13 is connected to the power take-off of the tractor, not shown, by means of a universal joint shaft 15. Above the fan wheel a conical feeding plate 16, also belonging to the feeding device, is rotatably mounted on the axle 6 by means of ball bearings 17. This plate is driven by the fan wheel through a speed reduction gear drive with a great gear ratio, which gear drive consists of a large internal tooth gear ring 18 fastened to the underside of the conical feeding plate 16 and meshing with a smaller gear ring 19. Said ring 19 is rotatably carried in a bearing eccentrically associated with eccentric bearing 20 of the fan wheel hub 9.

Between the feed plate 16 and the toothed gear rings 18 and 19 a disc 21 is fastened to the axle 6, said disc being provided with at least three bearing studs 22 for rollers 23, in a circle concentric with the axle 6. The rollers 23 engage in holes 24 in the smaller toothed ring 19, which holes have a diameter that is equal to the diameter of each roller plus twice the throw of the eccentric part 20 of the fan wheel hub 9. The gear ratio between the speed of the fan wheel and that of the feeding plate 16 can be expressed by the fraction $$\frac{T}{S-T}$$

where S is the number of teeth on the greater ring 18 and T the number of teeth on the smaller ring 19. If the difference in size between the toothed rings is small the gear ratio following will be great.

The present fertilizer distributor functions in the following manner. From the container 3 filled with fertilizer the fertilizer runs down on to the feeding plate 16, which is rotated with a relatively slow speed from the tractor take off as described above. The plate ejects the fertilizer towards the entrances of the spreader spouts 5 through the relatively small space between the feeding plate and the top edge of each spout. Here the fertilizer will be caught up by the strong air stream, which the fan wheel 7 sends through the spreader spouts, and blown out through the mouths of the spouts. In order to spread the fertilizer uniformly over the whole spreading range of the machine the spreader spouts 5 are of different lengths, as will be seen from Fig. 2, so that spouts nearly parallel with the transverse direction of the machine are longer than spouts, which are nearly parallel with the travelling direction of the machine. Said first mentioned longer spouts extend in the shown form beyond the ground wheels 25 of the machine.

Figure 3:
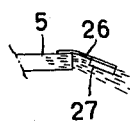
Fig. 3 is a section along the line A—A in Fig. 2 of one of the spreader spouts of the machine.

To further amend the uniform spreading of the fertilizer the exits of the spreader spouts 5 can be equipped with means for deflecting or dividing the stream of fertilizer. This means consist in the shown form of plates 26 in the mouth of each spout, which plates are so arranged that they deflect the stream of fertilizer downwards, as will be seen in Fig. 3. These plates can be fitted with one or two deflectors 27 placed underneath the plates 26, which divide each stream of fertilizer into streams with different directions as shown in Fig. 2.

The quantity of spread fertilizer can be regulated by means of a circular slide 28, which surrounds the feeding plate 16 and is supported by spokes 29 on a sleeve 30 slidable along the upper part of the axle 6. The sleeve is closed at its top and rests on a rod 31, which is vertically adjustable in the hollow axle 6. The bottom end of the rod is pivotally connected at 35 to a lever 33 which is pivoted around a transverse shaft 32. By altering the height of the lever the slide 28 can be raised or lowered, causing the space between the edge of the feeding plate 16 and the top edges of the spreader spouts 5 to be increased or decreased respectively. As will be seen from Fig. 4 the bottom edge of the slide 28 can be provided with a saw-toothed shape with two or more saw teeth 34 located straight before the inlet of each spreader spout 5. The upper edge of the slide is located outside the opening 4 of the container 3 as shown in Fig. 5.

Naturally the distributor machine may be modified and it may further be used for the spreading of other granulated materials than fertilizer.

I claim:

1. A distribution machine for the distribution of commercial fertilizer and the like, comprising a movable frame, a hopper including a bottom portion mounted in said frame, a feeding device and a spreading device disposed underneath said bottom portion of said hopper, said feeding device including a fixedly mounted vertical hollow axle, a driven conical feeding plate rotatably mounted on said axle, a driven fan wheel rotatably mounted below said feeding plate, a source of power on said frame, a hub rotatably mounted on said axle, means connecting said hub to said source of power to rotate the same, means connecting said fan wheel to said hub, and a gear train operatively connected between said fan wheel and said hollow axle to rotate said feeding plate at a lower angular velocity than the fan wheel, a vertically adjustable circular slide surrounding said feeding plate, a rod connected to said slide and slidably mounted in the axle, a lever, means connected to the lever and the rod allowing vertical adjustment of the rod and slide, the said spreading device including a plurality of spouts secured to the frame and disposed tangentially at equal spacing around said fan wheel, a pair of oppositely directed spouts directed transverse to the direction of motion of the machine being of greater length than the remaining spouts, orifices formed in all said spouts and deflectors secured to each spout at the end thereof whereby fertilizer spread out from forwardly directed spouts will partly be covered by fertilizer spread by a rearwardly directed spout to thereby obtain a fair distribution of the fertilizer over the spreading range of the machine.

2. A device for the distribution of finely divided material, comprising a movable frame, a hopper mounted on said frame, a feeding device and a spreading device disposed below said hopper, said feeding device comprising a vertical hollow axle, a conical feeding plate mounted on said axle and immediately below said hopper, a fan wheel disposed below the said plate, a source of power on the frame, means to connect said fan wheel to said source of power to rotate the same, a gear train between the said fan wheel and the axle to thereby rotate the said plate at a lower angular velocity than the fan wheel, an annular slide surrounding said plate, means to move said slide vertically to adjust the material output from the plate, and a series of spouts secured to the frame, said spouts having inner entrances defining a circular housing surrounding the fan wheel, said spouts being arranged tangentially outwardly from and equally spaced around said circular housing, one pair of spouts oppositely directed and substantially transverse to the direction of motion of the device being of greater length than the remaining spouts.

3. The device as set forth in claim 2, wherein the bottom of said slide has a series of teeth formed thereon, at least two teeth being located before the entrance of each respective spout.

References Cited in the file of this patent

UNITED STATES PATENTS

| | | |
|---|---|---|
| 423,814 | Richards | Mar. 18, 1890 |
| 441,810 | Strawson | Dec. 2, 1890 |
| 1,178,669 | Ollmann | Apr. 11, 1916 |
| 1,543,916 | Green | June 30, 1925 |
| 1,968,541 | Tatum | July 31, 1934 |
| 2,157,630 | Root | May 9, 1939 |

FOREIGN PATENTS

| | | |
|---|---|---|
| 731,773 | France | May 31, 1932 |